Dec. 10, 1968    R. L. CHRISTIANSEN ET AL    3,415,252
CIGARETTE IMPROVEMENT
Filed June 30, 1967
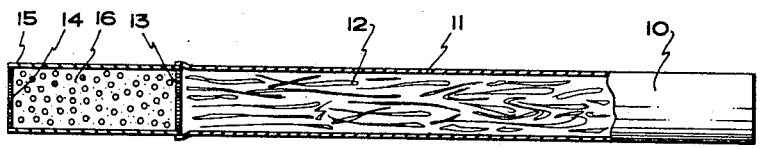
INVENTORS.
RULON L. CHRISTIANSEN
BY: CATHERYEN J. CHRISTIANSEN
THEIR ATTORNEY United States Patent Office 3,415,252
Patented Dec. 10, 1968

3,415,252
CIGARETTE IMPROVEMENT
Rulon L. Christiansen and Catheryen J. Christiansen, both of 302 North 1st West, Tooele, Utah 84074
Filed June 30, 1967, Ser. No. 650,479
5 Claims. (Cl. 131—10.7)

ABSTRACT OF THE DISCLOSURE

A smoking product such as a cigarette with a unique filter comprised in the main of pulverized bone material. The purpose of the filter is to reduce the amount of condensate which is entrained within the inhaled smoke. Such a filter material has proven through laboratory tests to be very effective. The bone material is preliminarily treated, preferably, with an agent such as borax powder in an aqueous solution. Such a solution tends to aid the removal of all foreign matter from the bone from which the filter is prepared and also to cure the bone material.

---

The present invention relates to smoking products such as cigarettes, cigars, pipes, and so forth, and more particularly to a new and improved filter for reducing the amount of condensate inhaled from the rearward end of a smoking item such as a cigarette.

In the past a number of various types of filters have been devised for use with smoking products such as cigarettes. A prime concern in the manufacturing of cigarettes is that the filter material be of extremely low cost, and yet preserve effectiveness as far as removing a significant portion of condensate from the inhaled smoke of the cigarette.

The inventors are familiar with the meat packing industry and have recognized that there is considerable difficulty in generating demand for the bones of animals and fowls after the same are dressed and meat is removed. It becomes a real problem of selling or otherwise disposing of the bones of all the animals, fish and fowl. Some small use has been made of bone in preparing a bone meal for fertilizer. Other bones are used in the preparation of glues and mucilage. And yet for many uses a number of different types of bone products are unsuited since no marrow is contained therewithin. The leg bones of beef are comprised of white bone material and have interior marrow; in contrast, the rib bones include an outer white bone material, an inner red material, but the ribs contain no marrow. It is a problem as to what to do with all of the bone materials in packing plants so that these can be used commercially.

The inventors have discovered a new use for bones which, when pulverized, can be used ideally as a filter substance for smoking products such as cigarettes. Laboratory experiments have shown that for beef bones that have been pulverized, a filter material composed of white beef bone material reduces condensate coming from a plain cigarette 20.41%. Correspondingly, use of red bone material in pulverized form as a cigarette filter has reduced condensate from a plain cigarette to 37.84% when compared to condensate coming from the same brand of a normal cigarette. The manner of treating the bone material preparatory to its introduction as a filter in a cigarette construction will be described hereinafter. Such additional treatment is required to aid the removal of foreign matter such as meat particles from the bone and also to cure the bone, this so that objectionable odors and taste are not present in the completed product.

When pulverized, it will be found that the bone material is slightly oily or greasy. This condition enables greater absorption of, if not dissolving, tars, nicotine and pyro-lignates from the tobacco smoke than were the substances completely "dry." Additionally, pulverized bone from freshly slaughtered cattle cannot be powdered but is somewhat coarse. This enhances the drawing qualities of the produced filter, while retaining the absorption qualities above mentioned and the simple physical condensation that takes place through the smoke cooling along its tortuous travel paths to the user's lips.

Accordingly, the principal object of the present invention is to provide a new and improved filter material for smoking products such as a cigarette.

An additional object is to devise a new and inobvious use for bone products which generally take the form of waste products in packing plants.

An additional object is to provide a method of treating bone materials so that the same can be used as filters for smoking products such as cigarettes.

An additional object is to provide a filter material for smoking products, such as cigarettes, wherein the same can be suitably encased between partitions or, alternatively, simply tamped within the cigarette construction.

An additional object is to provide a means of removing foreign products from bone material so that the latter can be pulverized so as to constitute a suitable filter product.

A further object is to provide a means for substantially reducing the cost of filters in cigarette construction.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

The sole figure is a side elevation, shown principally in sections, of a representative cigarette construction incorporating the bone material of the present invention as a filter.

In FIGURE 1 the cigarette 10 includes an outer cover or paper shell 11 for constraining the disposition of shredded tobacco 12 disposed therewithin. The rearward or left-hand side of the cigarette construction shows a representative filter wherein the same is comprised of an outer hardened paper shell 13 having end filter partitions 13 and 14. Disposed within the outer shell 15 is the filter material 16 which takes the form of pulverized, treated bone material. As to the type of bone material that can be used it is comprehended that fish, fowl or animal bones will be suitable. Special tests have been performed on beef bones at various points along the carcass. It has been noted that the leg bones of beef are composed of a white material, with the usual marrow passageway and marrow. There is generally no red bone material in the bones of beef. However, when one approaches the chest cavity of the carcass it is found that the rib bones contain outer white bone material, inner red material, but no marrow. Various conventional methods can be used in pulverizing the bone material, as by a ball mill, so that the red and white bone materials are mixed together, or, alternatively, the red and white materials are separated. All of this is strictly conventional, as in the preparation of bone meal. For example, the outer white coatings of bones of the rib bones can be removed through initial fracturing by any one of a number of means and separated and separatedly pulverized. Further, the leg bones can be completely pulverized and constitute a white bone meal. Additionally, all the bones can be mixed together to comprise a mixed white and red bone meal material.

Even though the bones have been cleaned quite well during the dressing of the animal, yet meat, fat and tissue products may well still stick to the bones, especially at the bone extremities. For this reason the bones are preferably initially washed thoroughly after scraping and the bones in either whole or preferably pulverized form are introduced in an aqueous solution of borax. The solution is constituted of approximately three cups of borax powder per gallon of water. The bone, if sufficiently porous, or bone which is crushed, is preliminarily soaked in the borax solution and allowed to cure. If the bone is permitted to stay in the solution about two days, the bone easily becomes clean or is thoroughly cleaned, is cured, and is ready for drying and for either initial or further pulverizing and introduction into the cigarette filter construction. The importance of use of a cleansing agent such as borax powder cannot be over-emphasized since, in the absence thereof, the foreign matter and marrow would tend to cause the pulverized bone material to go rancid and be objectionable as to taste and scent.

The pulverized bone material is introduced into the cigarette construction to form a half-inch filter, as shown at 16 in the figure. It may be desirable to include a small thin partition at 13 and 14 for containing the bone material filter so that the same will tend not to drop out at the end. The bone material is very slightly inflammable, and so it is of importance to have a partition as at 13 which is not inflammable and which therefore determines length of smoke such that the filter itself does not tend to burn. Thus, in the construction the cylindrical paper tube filter 15 can be provided, a thin cellulose filter wafer 13 disposed as a partition at the front end of the filter construction, the bone material introduced at 16, and then the end of the filter is capped by another smoke pervious partition at 14 which likewise may be made of a porous cellulose material. Subsequently the same is introduced into and secured as by gluing to the cover 11 of the cigarette.

Experiment has shown, however, that the existence of partitions 13 and 14 is not strictly necessary, especially where the cigarettes are not going to be subjected to excessive vibrations. The oily character of the bone material has been shown sufficient to cause the bone material to adhere together within the filter end of the cigarette when the bone materal is tamped slightly therein. In such event the cigarette can be made with a single tubular wrapping, with the bone material constituting the filter and being disposed within the rearward tip of the cigarette construction.

Experiment has shown that a reduction in condensate from that of a normal cigarette is experienced in the filter cigarette of the present day. Such reduction is of the order of 20.41% for white bone material, and 37.84% for red bone material. An intermediate reduction figure is obtainable when the white and red bone materials are mixed. Experimentation and laboratory tests have shown that with the use of very inexpensive and indeed, a throw-away waste product of packing plants, a usable product can be made. Such reduces the material cost of filters to an absolute minimum.

The above invention takes cognizance of the fact that the present market for bone material has been drastically reduced and that packers often must pay simply to have the bone material removed from their plants. This invention gives utility to what is otherwise largely a waste product, and is a means of providing further income to the packing industry.

We claim:

1. The process of making a cigarette filter, comprising the steps of providing bone, treating said bone with a cleansing and curing agent, and introducing the treated bone, in pulverized form into the filter-tip end of a cigarette, to comprise a filter therefor.

2. The process of claim 1 wherein said cleansing and curing agent comprises an aqueous solution of borax.

3. The process of claim 1 wherein said bone is pulverized subsequent to treatment by said cleansing and curing agent and prior to introduction into said cigarette.

4. In a cigarette having tubular cover means and tobacco disposed in said tubular cover means, an improvement comprising cleansed, cured, pulverized bone disposed as a filtering agent within said cover means and backing said tobacco.

5. The structure of claim 4 wherein said improvement includes filter partitions on opposite sides of said pulverized bone.

References Cited

UNITED STATES PATENTS 3,079,926   3/1963   Litchfield et al. ___ 131—10.7 X

SAMUEL KOREN, *Primary Examiner.*

D. J. DONOHUE, *Assistant Examiner.*

U.S. Cl. X.R

131—261, 265